(12) United States Patent
Cowden

(10) Patent No.: US 6,259,056 B1
(45) Date of Patent: Jul. 10, 2001

(54) SYSTEM AND METHOD FOR IDENTIFICATION OF MANUFACTURING COMPONENTS

(75) Inventor: Laura Cowden, Cleveland, OH (US)

(73) Assignee: Color Wheel Systems, L.L.C., Cleveland, OH (US)

( * ) Notice: Subject to any disclaimer, the term of this patent is extended or adjusted under 35 U.S.C. 154(b) by 0 days.

(21) Appl. No.: 09/496,107

(22) Filed: Feb. 1, 2000

Related U.S. Application Data

(60) Provisional application No. 60/118,097, filed on Feb. 1, 1999.

(51) Int. Cl.$^7$ ............................ B23K 26/36; G06F 17/60; G05B 19/418
(52) U.S. Cl. ...................................... 219/121.69; 700/116
(58) Field of Search .................. 219/121.68, 121.69; 209/552, 547; 700/116, 166

(56) References Cited

U.S. PATENT DOCUMENTS

| | | | |
|---|---|---|---|
| 4,332,012 | 5/1982 | Sekine et al. | 209/552 |
| 4,675,498 | * 6/1987 | Lemelson . | |
| 4,847,181 | 7/1989 | Shimokawa | 219/121.69 |
| 5,831,859 | * 11/1998 | Medeiros et al. | 700/116 |

FOREIGN PATENT DOCUMENTS

| | | |
|---|---|---|
| 594930A2 | 2/1993 | (EP) . |
| 0582964A2 | 4/1993 | (EP) . |
| WO 98/45827 | 10/1998 | (WO) . |

OTHER PUBLICATIONS

Search Report—Dated Jun. 16, 2000.
International Preliminary Examination Report issued Feb. 16, 2001, regarding corresponding International Application No. PCT/US00/02487.

* cited by examiner

Primary Examiner—Geoffrey S. Evans
(74) Attorney, Agent, or Firm—Thompson Hine & Flory LLP

(57) ABSTRACT

A method and system for identification of manufacturing components on an assembly line. The system is designed to be incorporated into a production line of a build-to-order plaint in which a series of components are arranged on the assembly line and different manufacturing operations are to be performed on each component. The components initially are identified by paper tags which are scanned into a manufacturing computer system, and each component includes an adhesive label which is capable of being laser engraved. The system includes a laser engraver, which is positioned immediately upstream of a first manufacturing operation, and the laser engraver is actuated by the factory computer system to etch an identification code on the adhesive label. The identification code may, if appropriate, change the identity of the component to which it is attached so that the sequencing of components on the assembly line can be rearranged, and components can be eliminated and added, without the necessity of physically moving the components. In a preferred embodiment of the invention, the system is incorporated into an automobile assembly plant and the laser engraver is positioned immediately upstream of the paint facility. The adhesive label includes a laminate overlay which is transparent to the laser engraver and which can be removed subsequent to a painting operation to reveal the new identity of the component etched on a substrate.

14 Claims, 1 Drawing Sheet

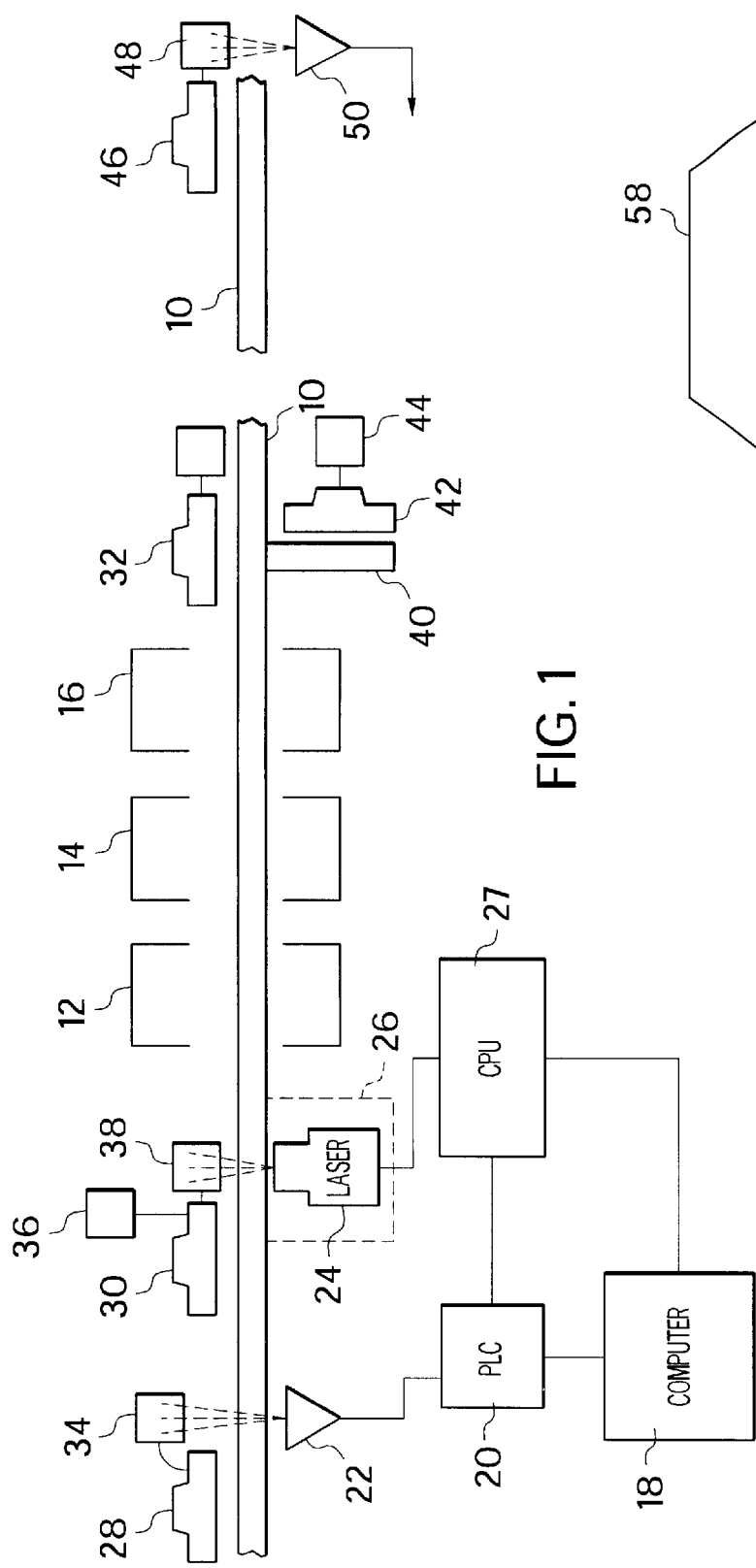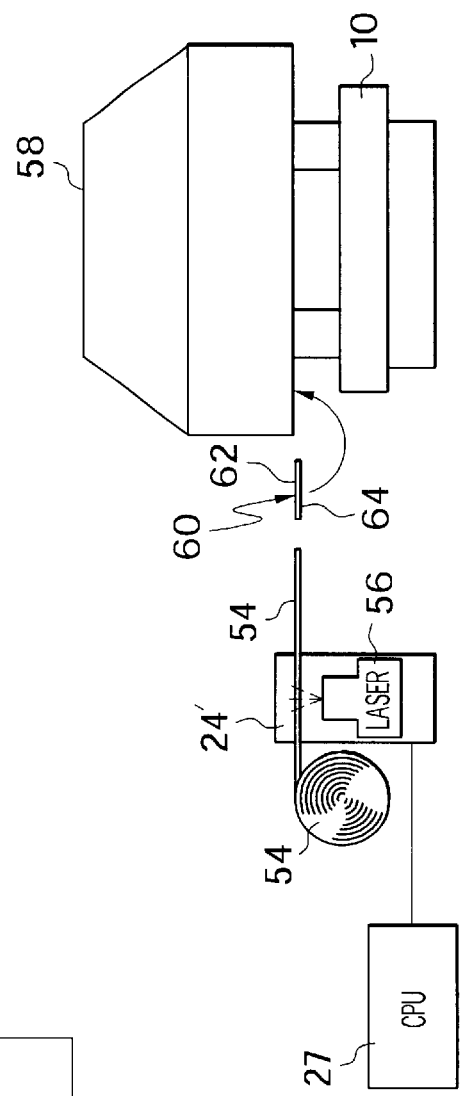

SYSTEM AND METHOD FOR IDENTIFICATION OF MANUFACTURING COMPONENTS

This application claims priority from U.S. application Ser. No. 60/118,097 filed Feb. 1, 1999, the disclosure of which is incorporated herein by reference.

BACKGROUND OF INVENTION

The present invention relates to manufacturing methods, and more particularly, to production line manufacturing methods which employ computer controls.

In a build-to-order production facility, a number of components are placed on a single production line but receive different manufacturing operations. A typical example of such a build-to-order production facility is an automobile manufacturing plant, where automobile vehicle bodies are placed on a single production line but receive different manufacturing operations. For example, such vehicle bodies may be painted different colors in a paint facility on the production line, receive a different engine, a different interior, and so on.

In such plants, each individual component, such as an automobile vehicle body, has been ordered by a purchaser or dealer and must carry information which identifies the configuration of the particular vehicle body and the custom manufacturing operations to be performed on that vehicle, such as color, vehicle interior components, vehicle engine specifications, and the like. Typically, such information is in the form of a random identifier, which may be simply a number, which has associated with it in the factory computer system the particular specifications. Such identifying information is placed on a paper label which is attached to a vehicle body. When the vehicle body is placed on a production line, this paper label is scanned and the random identifier number is fed to the factory system so that the factory system is aware of the location of the vehicle body. Thus, the identification tag enables the factory system to identify the location of a particular vehicle body within the plant and to ensure that the necessary manufacturing operations are performed upon it to result in the desired a configuration.

With such systems, it is impracticable to change the "identity" (i.e., the specific color, interior, engine and the like) of a vehicle body once it has been placed on the production line and identified with the paper label. While it is possible to remove the paper identification method label and replace it with one carrying different information, to effect such a change would require slowing down or stopping the production line, or removing the vehicle body from the line. A further disadvantage is that the print on the tag may smear or otherwise degrade as successive manufacturing operations are performed upon the associated vehicle body.

It is also known to use an RFID (radio frequency identification) tag, which is a hang tag having a microchip embedded within it which carries vehicle identification information. However, such RFID tags often fail, resulting in a loss of "identity" of the associated vehicle body. Furthermore, in order to optimize use of the production line and maximize output, it is sometimes necessary to change the order in which such vehicle bodies are sequenced on a production line. Accordingly, there is a need for a method and system for "rearranging" the order in which vehicle bodies are sequenced on a production line with minimal disruption of the operation of the line. Preferably, such a method and system would eliminate the need for replacing the paper labels or physically removing the bodies from the production line and reinserting them on the production line in a desired sequence.

SUMMARY OF THE INVENTION

The present invention is a method and system for identification of manufacturing components on an assembly line in which the identity of a component can be changed in real time so that the sequence of build-to-order components on an assembly line can be arranged to optimize the operation of the line and the rate of production of finished components. This method and system eliminates the need for physically rearranging the sequence of components on a production line and therefore eliminates the need for any equipment which would have been necessary to create such a physical rearrangement. Further, this system and method eliminates any production line stoppage or downtime which would have been necessary to replace conventional paper labels carrying identifying information. In addition, this system utilizes a tagging system which is more robust than prior art systems, so that the likelihood of an identification tag being damaged or lost is minimal in comparison to prior art systems.

In a preferred embodiment of the invention, the method and system includes the placing of a second identification label on a component on a production line, the second label having a laminate overlay and a substrate. A laser engraver is positioned adjacent to the production line and the label is oriented so that it can be etched by the laser engraver with an alphanumeric identification code which contains actual job data, specifying the manufacturing operations to be performed on the component and thus specifying its "identity." The etching process is performed by the laser with sufficient speed that the assembly line does not have to be stopped or slowed to enable such an etching process to occur. The laser is preferably controlled by a separate computer control which receives information from the associated factory computer control system and the PLC (programmable logic controller) that scans the paper identification label.

The laser engraving device is incorporated into a station which preferably is positioned immediately upstream of a manufacturing station, such as a paint booth. Consequently, a component on the production line, such as an automobile vehicle body, can be engraved with identifying information which either confirms the identifying information associated with the random identifier imprinted on the paper label, or is different from that associated identifying information, immediately prior to the vehicle body entering the paint booth. Consequently, this information etched on the label by the laser can give the component a new "identity," if desired.

The laminate label includes an overlay which is transparent to the laser so that the substrate of the label is etched with the new identification information. Once the vehicle body emerges from a paint booth, for example, the overlay, which may have been painted over and thus become opaque, can be removed, revealing the new identification code which will determine what subsequent manufacturing operations and accessories need to be performed and added to the painted vehicle body to complete its manufacture. As a result, the identity, and therefore the sequencing, of automobile vehicle bodies (in the preferred embodiment) on a production line can be changed in real time to optimize utilization of manufacturing facilities.

In an alternate embodiment of the invention, a laser engraving station is provided immediately upstream of the first manufacturing operation on the production line. This station includes a roll of laser-engravable labels from which a sheet of such labels is unrolled past a laser engraver. The laser engraver is actuated by a central processing unit to imprint identification information on a label on the sheet. That label is separated from the sheet and manually applied to a vehicle body on the production line.

Accordingly, it is an object of the present invention to provide a method and system of identification of manufacturing components on an assembly line; a method and system for identification of manufacturing components in which the sequencing of components on an assembly line can be varied without physically rearranging the order of the components on the assembly line; a method and system for identification of manufacturing components on an assembly line which is more robust and resistant to degradation and damage than paper labels or RFID labels; and a method and system for identification of manufacturing components which is of a relatively simple construction and can easily be integrated into the overall factory production system.

Other objects and advantages of the present invention will be apparent from the following description, the accompanying drawing and the appended claims.

BRIEF DESCRIPTION OF THE DRAWINGS

FIG. 1 is a schematic representation of a preferred embodiment of the method and system for identification of manufacturing components of the present invention; and FIG. 2 is a schematic representation of an alternate embodiment of the method and system for identification of manufacturing components of the present invention.

DETAILED DESCRIPTION

As shown in FIG. 1, a preferred embodiment of the method and system for identification and manufacturing components is incorporated in a build-to-order manufacturing facility, which in the preferred embodiment is an automobile manufacturing plant. The facility includes a production line or assembly line 10 having various stations for performing manufacturing operations, such as a paint booth 12, drying oven 14 and finesse deck 16. The operation of the assembly line 10 and manufacturing stations 12, 14 and 16 is automated, and is controlled by an overall factory computer system 18.

A PLC 20 receives information from a scanner 22 and feeds it to the factory computer system 18. The scanner is used to scan a paper identification tag attached to a vehicle body in the assembly line 10. A laser engraver 24 is positioned within a safety enclosure 26 and is positioned upstream of the paint booth 12. The laser engraver is well-known in the art and may be a modulated Nd:YAG or Vanadate laser, or a $CO_2$ laser such as that manufactured by AB Lasers of Acton, Mass. The laser engraver 24 is controlled by a cpu (central processing unit) 27 which receives information from PLC 20 and factory computer 18.

In the preferred embodiment, the assembly line 10 supports and conveys automobile vehicle bodies 28, 30, and 32. Vehicle body 28 includes a paper label 34 which carries an alphanumeric code, such as a bar code, which is a random identifier which identifies that vehicle. The random identifier is a number which is associated with data in the factory computer 18 which may specify the owner of the vehicle, and what particular manufacturing operations are to be performed on the vehicle, such as the color of paint to be applied to the vehicle in paint booth 12, the type of engine to be mounted on the vehicle at a station (not shown) downstream of the paint booth, and so on. This label 34 is scanned by scanner 22, which is a conventional bar code reader, and the information conveyed to the PLC 20 which transmits it to the factory computer system 18. In this way, the factory computer system 18 is able to locate vehicle body 28 at all times during the manufacturing operation, and more specifically, at all locations along assembly line 10.

Vehicle body 30 also includes a paper label 36 which carries identification information specific to that vehicle body. In addition, vehicle body 30, as do all vehicle bodies 28, 32, 42, 48 on the assembly line 10, includes a second label 38. Label 38 is of conventional design and includes a substrate carrying an adhesive and a laminate overlay. Such labels are commercially available from Beiersdorf, AG of Hamburg, Germany, and from Schreiner Etiketten of Munich, Germany. The laminate overlay of the label 38 is transparent to the laser generated by laser engraver 24. The label 38 is adhesively-mounted on the raw vehicle body 30 and is positioned so that the substrate it can be etched or engraved by laser engraver 24 as the vehicle body 30 passes the laser engraver on the assembly line 10, or lased within the laser unit and applied automatically and mechanically to the presented and designated unit, while on the line 10.

A holding area 40 is located downstream of the finesse deck 16 and can receive a vehicle body 42 for reassignment, filling an order, or to repair defects. Also at this location, the adhesive label 44 can be changed if the information has been laser etched on the label in error.

The method of the invention is as follows. A vehicle body 28 is placed on the assembly line 10 and given an identity in the factory computer system 18 associated with a numeric code printed on the paper label 34. As vehicle body 28 passes scanner 22, the identification code is scanned by scanner 22 and conveyed to the PLC 20, and from that control to the factory system 18 and cpu 27. The vehicle body 28 continues down assembly line 10 until it reaches the location of vehicle body 30 in FIG. 1. At this time, the laser engraver 24 is activated by cpu 27, based on information received from PLC 20 (the numerical code) and factory computer 18 (the associated identification information) to provide actual job data on the substrate of the adhesive label 38, preferably previously mounted within the engine compartment of the vehicle body 30 at the time the body is placed on the line 10.

If it is determined that the overall manufacturing operation would be optimized by changing the identity of the vehicle body 30 at that point, the factory computer 18 transmits new identification information to the cpu 27, and that identification information is engraved on label 38 by the laser engraver 24. In this way, a vehicle body at the location illustrated by vehicle body 30 may be given an entirely new "identity" which is manifested in the type of color applied to the body, the type of engine placed in the engine compartment, interior refinements and amenities, and so on. In the alternative, if there is no need to assign a new identity to the body 30, then the actual job data engraved on label 38 would simply be a confirmation of the data associated with the numeric code of paper label 36.

Subsequent to that second identification operation, the vehicle body 30 enters the paint booth 12 and is painted the color specified on the adhesive label (label 38 for vehicle body 30). Subsequent to painting, the vehicle body enters the oven 14 for drying the paint and from there to the finesse deck 16 where minor imperfections are removed. The painted vehicle body (shown as vehicle body 32) emerges from the finesse deck 16 and progresses downstream on the assembly line 10 for subsequent manufacturing operations. The label 38, which has been painted over, can reveal the new identity with the removal of the overlay, which exposes the laser-etched substrate.

In this fashion, if it is deemed necessary by the factory system 18 to resequence the order of vehicle bodies on the assembly line upstream of the paint booth 12, such as, for example, to paint a number of vehicle bodies a certain color, such rearrangement can be effected without physically changing the sequence of vehicle bodies on the assembly line. Further, if it is desired to eliminate completely a particular vehicle body configuration from the assembly line, this elimination can be effected by changing the identity of the vehicle on the adhesive label 38.

It is within the scope of the invention to provide the manufacturing facility with subsequent manufacturing stations, each with its own laser engraver. In such an instance, it may be necessary to add additional information in the form of an alphanumeric code to the code previously printed on the adhesive label which would modify the identity of the vehicle body to which it is attached. Otherwise, the identity of the vehicle is read from the first adhesive label at subsequent manufacturing stations, as shown in FIG. 1 by vehicle body 46 and adhesive label 48, which is read by scanner 50 and in which the information is conveyed to factory system 18.

An alternate embodiment of the invention is shown in FIG. 2, in which the cpu 27 of FIG. 1 is in communication with a laser engraving station 24' which includes a roll 52 from which a sheet 54 of labels is payed out past a laser engraver 56. The laser engraver 56 is directed by the cpu 27 to imprint labels on the sheet 54 with an identifying code for a particular vehicle body 58 on the production line 10. An individual label 60, etched with appropriate data, is then placed on the vehicle body 58. An adhesive backing applied to the laser-etched substrate 62 secures the label to the body 58. As in the embodiment of FIG. 1, the data etched on the substrate 62 is protected by the overlay 64.

While the systems and methods herein described constitute preferred embodiments of this invention, it is to be understood that the invention is not limited to these precise systems and methods, and that changes may be made therein without departing from the scope of the invention.

What is claimed is:

1. A method for identification of manufacturing components on an assembly line comprising the steps of:

placing a component on an assembly line, said component having a machine-readable label having information indicating a first identity of said component and specifying at least one manufacturing operation to be performed on said component;

scanning said label to determine said information;

applying a second label to said component, said second label having a laminate overlay and a substrate, said substrate being etchable;

performing said manufacturing operation on said component; and prior to said step of performing said manufacturing operation, etching said substrate of said second label beneath said laminate with information indicating an identity of said component and specifying at least one manufacturing operation to be performed on said component, said information on said second label being protected by said overlay and unaffected by said manufacturing operation.

2. The method of claim 1 further comprising the step of, subsequent to said step of performing said manufacturing operation, removing said laminate to reveal said identity information on said second label.

3. The method of claim 1 wherein said manufacturing operation specified by said second label is different from said manufacturing operation specified by said first label.

4. The method of claim 1 wherein said step of etching said label includes etching said label with information indicating a second identity of said component, said second identity being different from said first identity.

5. The method of claim 4 wherein said step of etching said label includes receiving instructions from an associated factory system for said second identity.

6. The method of claim 1 further comprising the step of, subsequent to said step of performing said manufacturing operation, performing subsequent manufacturing operations on said component to compete manufacture of said component.

7. The method of claim 1 wherein said manufacturing operation is a step of painting said component a selected color.

8. The method of claim 7 wherein said component is an automobile vehicle body.

9. The method of claim 1 wherein said etching step includes the step of etching said substrate with a laser.

10. The method of claim 1 wherein said placing step includes the step of placing a component on an assembly line, said component having a machine-readable paper label having information indicating a first identity of said component and specifying at least one manufacturing operation to be performed on said component.

11. The method of claim 1 wherein said step of etching said substrate is performed prior to said step of applying said second label to said component.

12. The method of claim 11 wherein said step of etching said substrate includes the steps of paying out a sheet of said second labels from a roll past a laser engraver, actuating said laser engraver to etch identifying information on a second label on said sheet, separating said etched second label from said sheet, and applying said etched second label to one of said components.

13. A method for identification of manufacturing components on an assembly line comprising the steps of:

placing a component on an assembly line, said component having a machine-readable label having information indicating a first identity of said component and specifying at least one manufacturing operation to be performed on said component;

scanning said label to determine said information;

applying a second label to said component, said second label having a laminate overlay and a substrate, said substrate being etchable;

performing said manufacturing operation on said component;

prior to said step of performing said manufacturing operation, receiving instructions from an associated factory system for a second identity for said component and etching said substrate of said second label beneath said laminate with information indicating said second identity of said component, said second identity being different from said first identity, and specifying at least one manufacturing operation to be performed on said component, said manufacturing operation specified by said second label being different from said manufacturing operation specified by said first label, said information on said second label being protected by said overlay and unaffected by said manufacturing operation;

subsequent to said step of performing said manufacturing operation, removing said laminate to reveal said identity information on said second label; and advancing said component downstream on said assembly line and reading said identity information on said second label prior to performing a subsequent manufacturing operation on said component.

14. A method for identification of automotive vehicle bodies on an assembly line comprising the steps of:

placing a vehicle body on an assembly line, said vehicle body having a machine-readable label having information indicating a first identity of said component and specifying at least one manufacturing operation to be performed on said component;

scanning said label to determine said information;

applying a second label to said vehicle body, said second label having a laminate overlay and a substrate, said substrate being etchable;

performing said manufacturing operation on said vehicle body;

prior to said step of performing said manufacturing operation, receiving instructions from an associated factory system for a second identity for said vehicle body and etching said substrate of said second label beneath said laminate with information indicating said second identity of said vehicle body, said second identity being different from said first identity, and specifying at least one manufacturing operation to be performed on said vehicle body, said manufacturing operation specified by said second label being different from said manufacturing operation specified by said first label, said information on said second label being protected by said overlay and unaffected by said manufacturing operation;

subsequent to said step of performing said manufacturing operation, removing said laminate to reveal said identity information on said second label; and advancing said vehicle body downstream on said assembly line and reading said identity information on said second label prior to performing a subsequent manufacturing operation on said vehicle body.

* * * * *